United States Patent

Martin et al.

[15] 3,641,282

[45] Feb. 8, 1972

[54] CONTROL APPARATUS FOR A TAPE DRIVE

[72] Inventors: William A. Martin, Fairport; Marvin S. Bielicki, Rochester, both of N.Y.

[73] Assignee: Eastman Kodak Company, Rochester, N.Y.

[22] Filed: Oct. 31, 1969

[21] Appl. No.: 872,922

[52] U.S. Cl. ........................... 179/100.2 S, 274/4 D, 352/15

[51] Int. Cl. ........................... G11b 23/44, G03b 31/00

[58] Field of Search ............ 179/100.2 R, 100.2 S, 100.2 MP; 242/200, 67.4; 274/4 D; 352/7, 12, 20, 15, 22, 31

[56] References Cited

UNITED STATES PATENTS

| | | | |
|---|---|---|---|
| 2,932,235 | 4/1960 | Ochiai | 179/100.2 S |
| 2,975,672 | 3/1961 | Shields | 179/100.2 S |
| 3,200,206 | 8/1965 | Johnson | 179/100.2 S |
| 3,278,251 | 10/1966 | Freudenschuss | 352/15 |
| 3,373,913 | 3/1968 | Atsumi | 179/100.2 R |

*Primary Examiner*—Stanley M. Urynowicz, Jr.
*Assistant Examiner*—Alfred H. Eddleman
*Attorney*—Robert W. Hampton and William F. Delaney, Jr.

[57] ABSTRACT

An override control in a tape recorder includes a motor, tape drive means driven by the motor and engageable with the tape to advance it past a transducer station, a transducer engageable with the tape at the station, and an actuating member for positioning the transducer and the tape drive means in engagement with the tape to enable operation of the recorder by turning on the motor. The override control is provided for selectively enabling and disabling the tape drive when the motor is operating and the actuating member has positioned the transducer in engagement with the tape to adapt the recorder to fast start/stop operation which is useful in the recording of synchronized sound motion pictures. Preferably, the override control is actuated in response to insertion of a plug into a jack provided on the recorder. In a recorder of the type in which a spring-loaded pressure roller presses the tape against a capstan to advance the tape, the override control may comprise means for selectively disabling the spring biasing the pressure roller to permit a solenoid to selectively control the engagement and disengagement of the pressure roller against the tape and capstan.

6 Claims, 4 Drawing Figures

WILLIAM A. MARTIN
MARVIN S. BIELICKI
INVENTORS

BY William F. Delaney Jr.
Robert W Hampton

ATTORNEYS

WILLIAM A. MARTIN
MARVIN S. BIELICKI
INVENTORS

William F. Delaney Jr.

BY Robert W Hampton

ATTORNEYS

WILLIAM A. MARTIN
MARVIN S. BIELICKI
INVENTORS

BY William F. Delaney Jr.
Robert W Hampton
ATTORNEYS

WILLIAM A. MARTIN
MARVIN S. BIELICKI
INVENTORS
BY William F. Delaney Jr.
Robert W Hampton
ATTORNEYS

CONTROL APPARATUS FOR A TAPE DRIVE

BACKGROUND OF THE INVENTION

1. Field of the Invention

This invention relates to a control apparatus for a tape drive for use in tape recorders or players. More particularly this invention relates to a portable tape recorder which is particularly adapted for use with motion picture apparatus to record and play back sound in synchronization with motion picture image recording and projection, respectively.

2. Description of the Prior Art

Systems are known for producing sound motion pictures with the sound recorded on a medium separate from the film, such as a magnetic tape. Such systems usually include a sound recorder that is operated with a movie camera for recording and with a movie projector for playback. In such systems the sound recording must be synchronized with the film, and this has been accomplished by use of mechanical or electrical systems that coordinate the operation of the camera and/or projector with that of the tape recorder. For example, it is known to start the sound recorder and camera simultaneously and to provide a "start" mark on either the sound carrier or the film as a reference point for subsequently starting the projection and play back of a sound sequence in synchronization. In a system, in which the "start" mark is on the film, the projector is started first and a sensor in the projector detects the mark and sends a signal to the sound recorder to start. Similarly, when either the sound recorder or camera is stopped, a stop signal is recorded on the film or sound carrier as a reference signal which can subsequently be detected by a projector or sound player to stop either or both of them at the appropriate times.

In such sound motion picture systems the sound recorder and the sound player are usually incorporated in a magnetic tape recorder-reproducer which will be referred to simply as a tape recorder, hereinafter, in accordance with conventional terminology in the art.

Preferably, the tape recorder used in such a system is a battery-powered portable recorder to permit the making of sound movies where an external power supply is not available. Portable tape recorders usually have a tape drive that is started and stopped by turning a drive motor on and off while the transducer head and drive capstan are left in engagement with the tape, as distinguished from nonportable recorders which usually incorporate fast start/stop control systems actuated by solenoids. Such portable systems start and stop the tape at a relatively slow rate due to inertia in the drive system, but they have the advantage of requiring less power than fast start/stop control systems generally used in nonportable recorders. However, when sound motion picture systems employing portable tape recorders are started and stopped by turning the motor on and off, an unsynchronized period is introduced due to the different rates of acceleration and deceleration of the film and tape.

SUMMARY OF THE INVENTION

It is an object of this invention to provide an improved control for the tape drive of a portable tape recorder which may be operated either by turning the recorder motor on and off for conventional recording uses or by a fast start/stop override control means when synchronization with an external device, such as a motion picture projector, is desired.

One preferred embodiment of the invention is disclosed in connection with a tape recorder including a motor, a tape drive means driven by the motor and engageable with tape to advance it past a transducing station, a transducer engageable with the tape at the transducer station, and a movable actuating member for positioning the transducer and the tape drive means in engagement with the tape to enable operation of the recorder by turning the motor on. An override control is provided for selectively enabling and disabling the tape drive means when the motor is energized and the actuating member has positioned the transducer in engagement with the tape.

The override control means includes means for moving the actuating member to position the transducer in engagement with the tape and for disabling the tape drive means in response to a condition, such as the connection of an electrical connector with a connector provided in the recorder, and a solenoid motor for selectively enabling and disabling the tape drive means when the actuating member has been thus moved.

DESCRIPTION OF THE PREFERRED EMBODIMENTS

Figure 1:
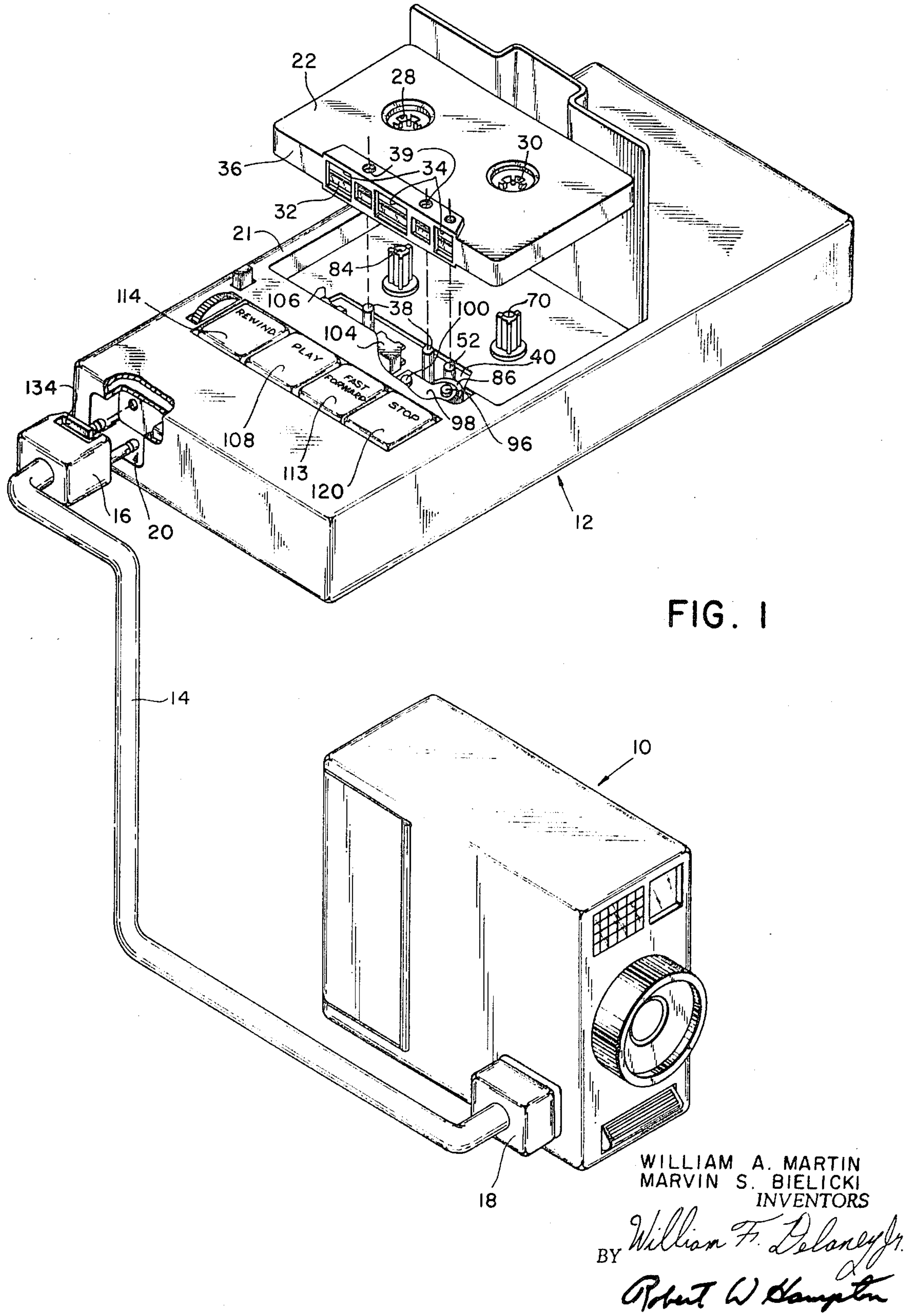
FIG. 1 is a perspective view of a cassette tape recorder and a movie camera connected by an electrical cord for carrying synchronizing signals between the camera and recorder.

As seen in FIG. 1, a motion picture camera 10 is adapted for connection to a magnetic tape recorder 12 by an electrical cord 14 having male connectors or plugs 16 and 18 that are insertable into a recorder female connector or jack 20 and a camera jack (not shown), respectively, to transmit synchronizing signals between the camera and recorder. Although it is not shown in the drawings, the recorder can also be connected with a projector by a similar cord for synchronizing film projection with sound playback. Although the invention may be applied to various types of portable recorders, the recorder shown in the drawings is a magazine-type recorder having a housing 21 adapted for receiving a tape cassette or magazine 22 containing a supply reel 24 and a takeup reel 26, which have cores 28 and 30 respectively. A sound carrier or tape 32 wound onto the reels is guided along a path from one reel to the other past apertures 34 in the front wall 36 of the cassette 22 permitting engagement of the tape 32 by transducers and drive mechanisms (later described) in the recorder when the cassette is aligned by projections 38 on the recorder fitted in apertures 39 in the cassette.

Figure 2:
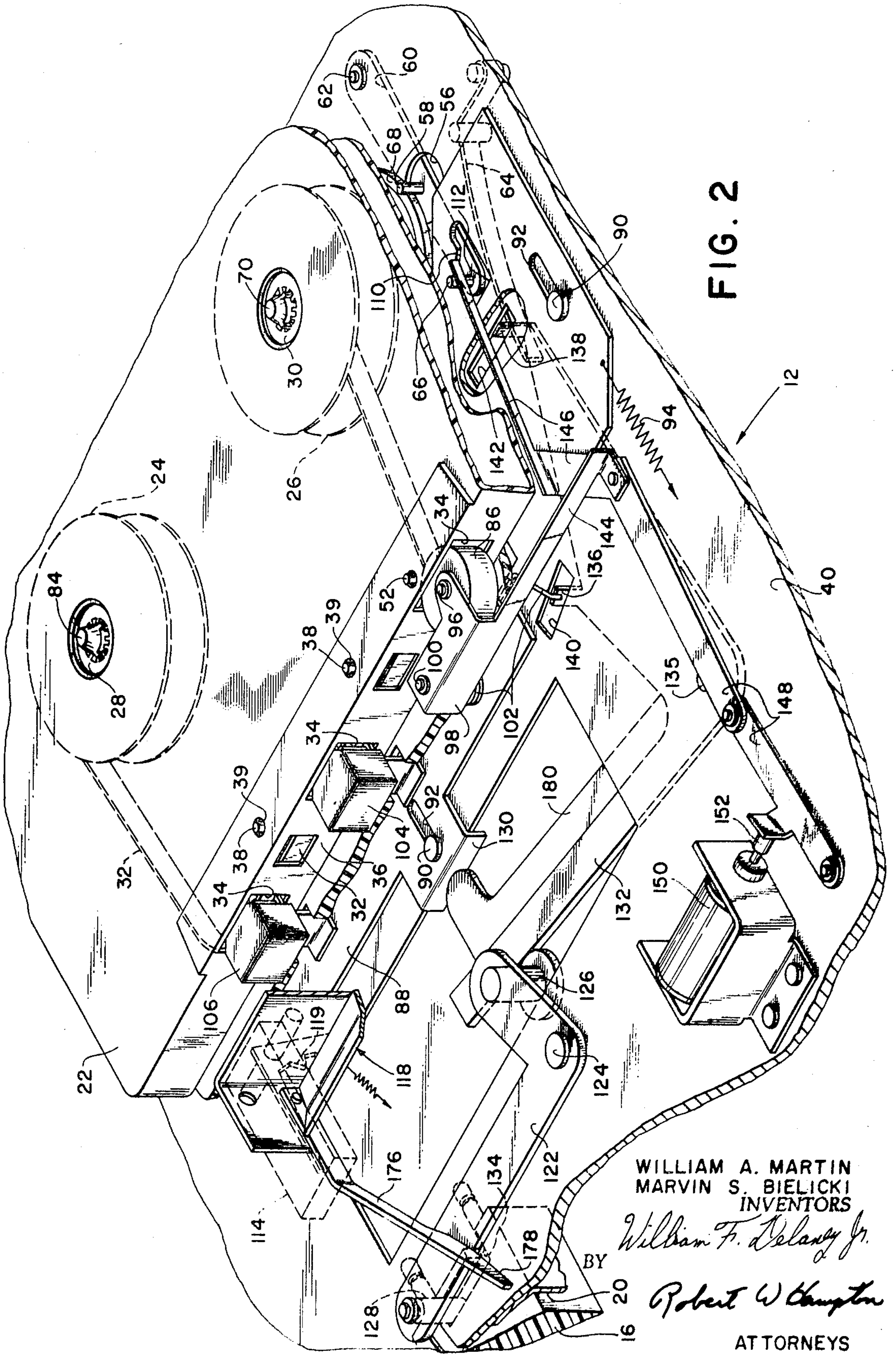
FIG. 2 is a perspective view of the recorder shown in FIG. 1 with the outside casing removed and portions broken away to show the control apparatus according to one embodiment of the invention in a record/playback mode.
Figure 3:
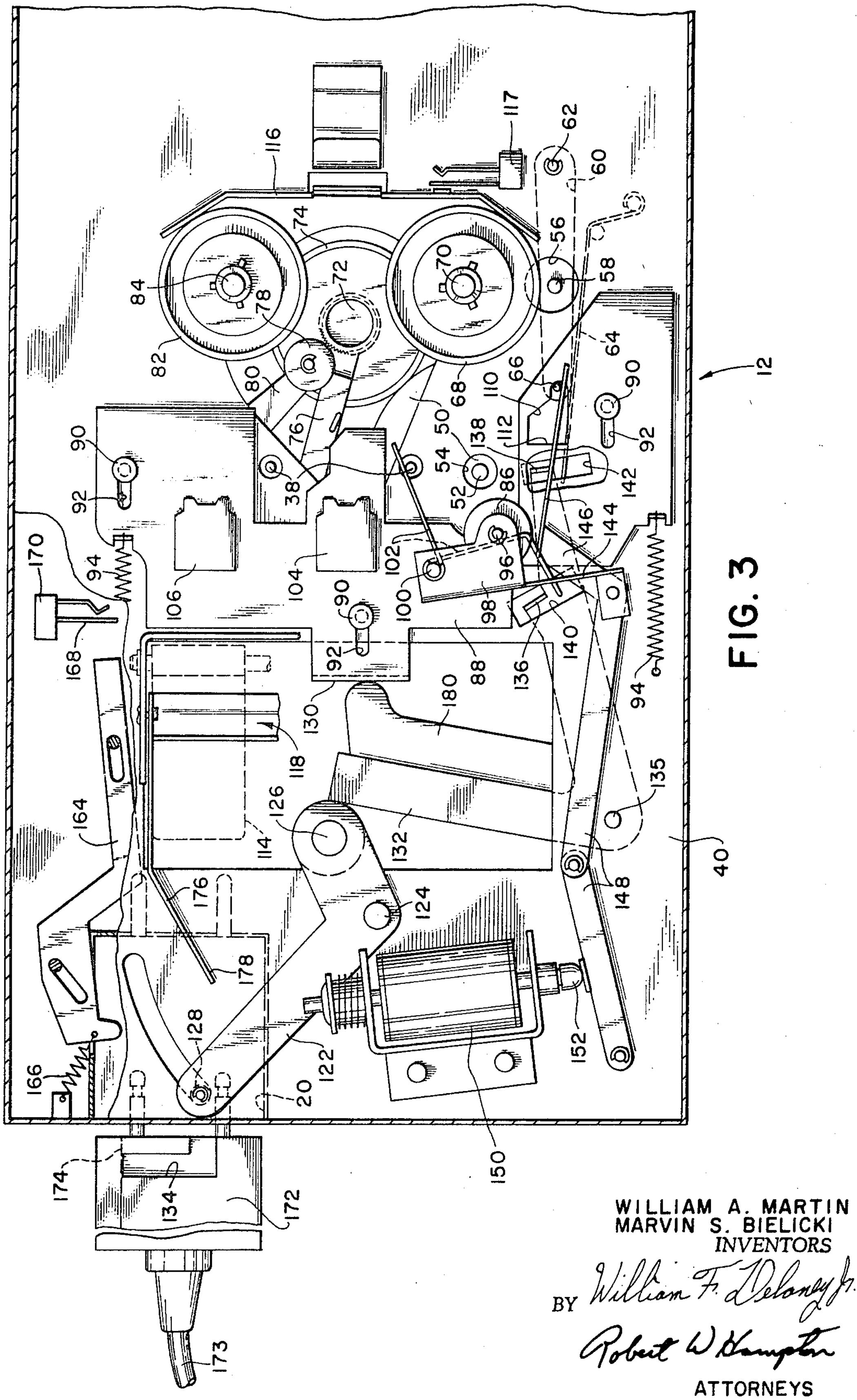
FIG. 3 is a top view of the recorder control apparatus shown in FIG. 2 with the tape cassette removed to show some of the recorder mechanism in a stop mode.
Figure 4:
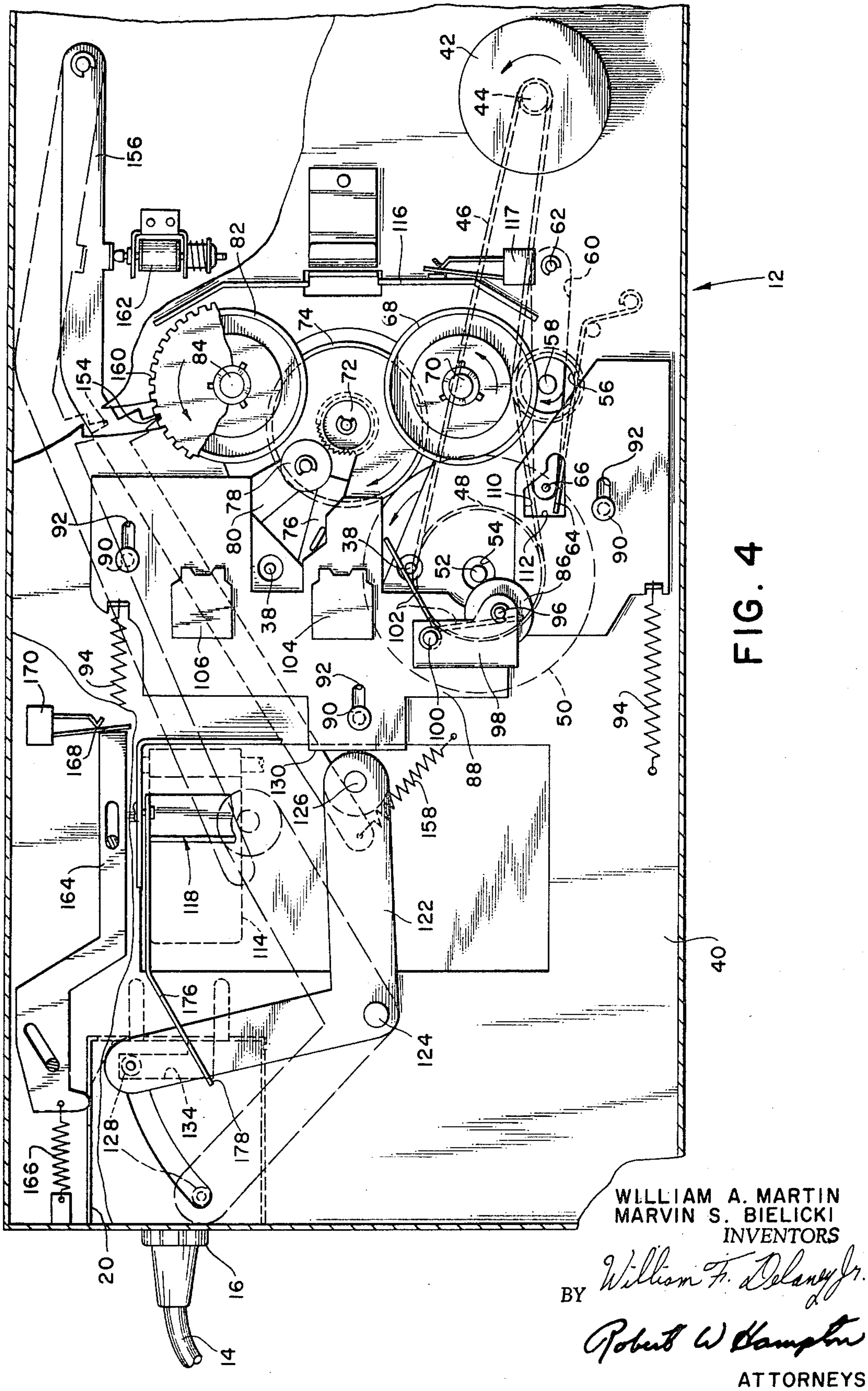
FIG. 4 is a view similar to FIG. 3 showing additional recorder mechanism and a control apparatus according to an alternative embodiment of the invention.

Within the tape recorder housing 21, as seen more clearly in FIGS. 2–4, the recorder chassis includes a baseplate 40 on which various parts of the recorder mechanism are mounted. An electric motor 42, seen in FIG. 4, is mounted on the baseplate and has a drive pulley 44 for driving the main rotating parts of the recorder by means of a belt 46. The belt passes around a tape-drive pulley 48 attached to a flywheel 50 and a capstan 52 extending upwardly through an aperture 54 in the baseplate 40. The belt 46 also passes around a takeup drive pulley 56 attached to a drive shaft 58 that is rotatably mounted on a lever 60. The lever, which is pivotally mounted on a stud 62 attached to the baseplate, is engaged by a spring 64 that biases the lever to urge the takeup drive shaft 58 toward frictional driving engagement with a takeup drive wheel 68. A drive spindle 70 is mounted on the drive wheel 68 for driving engagement within the core 30 of the takeup reel 26 when the cassette 22 is mounted in the recorder.

As indicated by the arrows in FIG. 4, the drive pulley 44 is driven in a counterclockwise direction to rotate the capstan 52 counterclockwise, and to rotate the takeup drive shaft 58 clockwise to drive the takeup spindle 70 counterclockwise when the drive shaft 58 engages the takeup drive wheel 68 for winding up tape.

An idler roller 72 attached to an idler drive wheel 74 is also driven by the motor drive pulley 44 through frictional driving engagement with the capstan flywheel 50. The idler roller 72 is freely rotatably mounted on a movable control arm 76 which can selectively move idler roller 72 into driving engagement with takeup drive wheel 68 to rotate the takeup spindle in a counterclockwise direction at a higher rate of speed than when it is being driven through the drive shaft 58. A reversing idler roller 78 is freely rotatably mounted on a movable control arm 80 which can move the reversing roller 78 into simultaneous frictional driving engagement with the idler roller 72 and with a supply drive wheel 82 to drive a supply spindle 84 mounted on the drive wheel 82 in a clockwise direction. The supply spindle 84 is engageable within the core 28 of the supply reel 24 when the cassette is mounted in the recorder, and the tape 32 can be rewound onto the supply reel by driving the supply spindle 84 in a clockwise direction. Thus, the various manipulations of the drive shaft 58, the idler roller 72 and the reversing roller 78, as described above, provide for "-forward," "fast-forward" and "rewind" modes of operating the recorder.

For recording or playing back the takeup reel 26 is driven in the "forward" mode, that is counterclockwise by the drive shaft 58, but the tape must be advanced at constant rate. To accomplish this the tape is fed through the nip between the driving capstan 52 and an associate, spring-loaded, pressure roller 86. The pressure roller is moved into and out of driving engagement with the capstan by a slide plate 88 that is mounted for front-to-rear movement on the baseplate 40. Pins 90 extending from the baseplate through guide slots 92 in the slide plate define the direction and limits of travel of the sliding plate which is biased by springs 94 toward its front "stop" position in the recorder. The pressure roller 86 is freely rotatably mounted on a pin 96 mounted on an arm 98 that pivots on a shaft 100 attached to the slide plate 88. A spring 102 engages the arm 98 to bias the pressure roller 86 counterclockwise on shaft 100, so that the roller engages the capstan 52 when the slide plate is in its rear "record/playback" position. Also mounted on the slide plate 88 is a "record/playback " transducer head 104 for recording and playing back magnetic signals on tape advanced past the head in engagement therewith, and an erase transducer head 106 for erasing magnetic signals on the tape.

To enable the selection of various modes of operation, the recorder has a plurality of pushbuttons operable from the exterior of the recorder and connected by linkages (not shown) to various control mechanisms within the recorder and to switches for controlling various circuit components (not shown) of the recorder. A "play" mode pushbutton 108 is adapted, upon being depressed, to push the slide plate 88 to its rear "record/playback" position against its spring bias to move the transducer heads and the pressure roller into engagement with tape in a cassette in the recorder. At the same time a cam surface 110 defined by an aperture 112 in the slide plate permits the lever 60 to move the takeup drive shaft 58 into driving engagement with the drive wheel 68 to windup tape on the takeup reel. Thus, the tape is advanced by the capstan past the transducer heads to record, playback or erase signals on the tape depending on the circuit components that are switched on. A "fast forward" button 113 is linked to the control arm 76 for moving the idler roller 72 into and out of engagement with the takeup drive roller 68. A "rewind" button 114 is linked to control arm 80 to move the reverse idler roller 78 into and out of engagement with the idler roller 72 and the supply drive wheel 82. Depressing any one of these three buttons causes a brake arm 116 to disengage from the supply and takeup drive wheels 68 and 82. Rearward movement of the brake arm 116 causes it to engage and close a switch 117 that is adapted to turn on electrical components (not shown). A pivotally mounted lock bar 118 beneath the pushbuttons is biased to engage and retain detents 119 on these three buttons when they are depressed. A button held down by the lock bar can be released by depressing any of the other buttons, including a "stop" button 120, because the detent 119 on the button being depressed engages and rotates the lock bar out of engagement with the detent on the retained button. In addition to releasing the lock bar, the stop button 120 is also adapted to move the brake arm 116 into engagement with the drive wheels 68 and 82.

Tape recorders according to the disclosed embodiments of the invention include a control lever 122 pivoted on a stud 124 and having pins 126 and 128 extending from opposite ends of the lever. The pin 126 is adapted to push a depending tab 130 on the slide plate 88, either by direct engagement, as seen in FIG. 4, or through an intermediate pivot arm 132 that engages the tab 130 as seen in FIGS. 2 and 3. Upon rotation of the control lever in a clockwise direction, the slide plate 88 is pushed in a rearward direction against its spring bias toward its "record/playback" position. Although, this control lever could be designed for manual actuation, the disclosed embodiments provide for its actuation in response to insertion of a plug into the jack 20. The pin 128 is positioned for engagement within a slot 134 defined in the top of the camera/recorder plug 16 or the projector/recorder plug 172 to rotate the lever clockwise when the plug is inserted in the jack.

Both embodiments of the invention include means associated with the control lever 122 for selectively actuating and disabling the tape drive of the recorder by a solenoid motor. In the preferred embodiment of the invention, shown in FIGS. 2 and 3, the intermediate pivot arm 132 has two detents 136 and 138 which extend through slots 140 and 142 respectively, and which move in an arcuate path in the slots when pivot arm rotates on a stud 135. Thus, as the pivot arm 132 moves the slide plate to its "record/playback" position, the detent 136 moves into a blocking position with respect to the spring 102 biasing the pressure roller 86 toward the capstan 52, and the detent 138 moves into a blocking relation with respect to the spring 64 biasing the takeup drive shaft 58 against the takeup drive wheel 68. When these two biasing members are disabled by the detents 136 and 138, the tape is not advanced even though the capstan and drive shaft are driven by the motor. To control the tape drive the pressure roller and the pivot arm carrying the takeup drive are connected by linking arm 144 and bias spring 146 respectively to a toggle linkage 148 controlled by a solenoid 150. When the solenoid is energized to extend its plunger 152, the toggle 148 pivots the linking arm 144 to move the pressure roller into engagement with the tape, and it pivots the bias spring 146 to move the takeup drive shaft into engagement with the drive wheel, so that the recorder drive mechanism is engaged and tape is advanced past the transducer heads. When the solenoid is deactivated and its plunger retracted, the toggle disengages the pressure roller and takeup drive shaft to quickly stop tape advancement. Thus, this mechanism provides a rapid start/stop control for the tape recorder when the plug is inserted into the jack. Yet, this mechanism permits the recorder to be operated by starting and stopping the motor to reduce the drain on the power batteries for other uses which do not require fast start/stop operation.

In the FIG. 4 embodiment a pawl 154 mounted on an arm 156 is biased by a spring 158 toward engagement with a ratchet 160 attached to the supply spool spindle. When the recorder is not being used for producing sound motion pictures and there is no plug inserted in the jack, the control lever 122 is in its counterclockwise position and engages the arm 156 to hold the pawl out of engagement with the ratchet. But when the plug is inserted in the jack to rotate the lever 122 clockwise, the arm 156 is no longer blocked and the pawl is biased toward engagement with the ratchet. The arm then is controlled by a solenoid 162 which selectively rotates the arm to engage or disengage the pawl from the ratchet for fast start/stop operation of the tape, such as required for synchronizing the recorder with a camera.

In both embodiments of the invention a slide bar 164 is mounted adjacent the jack and biased by a spring 166 toward engagement with a plug inserted in the jack. When a camera/recorder plug is inserted in the jack, it moves the slide bar against its spring bias into engagement with a switch arm 168 to close a switch 170 which actuates the electrical components (not shown) used for recording operations. However, when the recorder is being used with a projector for synchronous motion picture projection and sound play back, it is desired that the recording switch not be closed. Therefore, a plug 172 on the recorder/projector electric cord 173, seen in FIG. 3, is provided with a cutaway portion 174 which permits the plug to be inserted into the jack without engaging the sliding-pivoting member, so that the recorder operates in its playback mode rather than in its recording mode.

Another feature of the invention is the automatic disabling of the pushbutton lock bar 118 in response to insertion of a plug in the jack. According to the disclosed embodiments of the invention, an arm 176 attached to the lock bar extends forward where it is engaged by the control lever 122 when the lever is rotated by engagement with a plug inserted in the jack. When the lever is rotated, it engages a cam surface 178 on the lock bar arm to raise the arm and rotate the lock bar against its spring bias to a position in which it does not engage the detents 119 on the pushbuttons when they are depressed. This feature assures that the recorder will remain in its play or record mode when the corresponding plug is left inserted in the jack to permit the cartridge to be removed and replaced in the recorder while a plug is in the jack. To disengage the heads from the tape without removing the plug the intermediate pivot arm 132 is provided with a flexible spring portion 180 which engages the tab 130 when a plug is inserted in a jack. This flexible portion of the arm is positioned beneath the detent 118 on the "stop" button so that depression of the "stop" button depresses the flexible arm portion beneath the depending tab 130 to permit the slide plate to move forward to its "-stop" position.

The invention has been described in detail with particular reference to preferred embodiments thereof, but it will be understood that variations and modifications can be effected with the spirit and scope of the invention.

I claim:

1. In a tape recorder including a motor, a transducer station, a plate mounted for movement between a record position and a stop position, means for moving said plate to its record position when the motor is energized and to its stop position when the motor is not energized, transducer means engageable with the tape at the transducer station by movement of the plate to its record position, and tape drive means for transporting tape past the transducer station when the plate is in its record position; the improvement comprising control means for selectively disabling the tape drive means while said plate remains in its record position and said motor remains energized.

2. In a tape recorder including a rotatably mounted capstan, a transducing station, means energizable for rotatably driving the capstan, a plate mounted for movement between a record position and a stop position, transducing means connected to the plate for movement therewith from a position spaced from the tape when the plate is in its stop position to a position in engagement with the tape when the plate is in its record position, a pressure roller connected to the plate for movement therewith from a position spaced from the capstan when the plate is in its stop position to a position adjacent the capstan when the plate is in its record position, bias means for urging the pressure roller to an active position wherein the roller is located with respect to the capstan for pressing tape against the capstan to effect feeding of the tape past the capstan when the plate is in its record position, and first control means for moving the plate from its stop position to its record position, the improvement comprising:

means for selectively disabling the bias means while said plate remains in its record position and said capstan is being driven by said energizable means; and second control means for selectively moving the pressure roller to its active position when the bias means has been disabled.

3. The combination as defined in claim 2 wherein said last-mentioned means comprises electromechanical transducer means for selectively moving the pressure roller into its second position in response to electrical signals.

4. In a tape recorder controllable by signals from a photographic apparatus having an electrical connector said recorder including a rotatably mounted capstan, a transducing station, means energizable for rotatably driving the capstan, a plate mounted for movement between a record position and a stop position, transducing means connected to the plate for movement therewith from a position spaced from the tape when the plate is in its stop position to a position in engagement with the tape when the plate is in its record position, a pressure roller connected to the plate for movement therewith from a position spaced from the capstan when the plate is in its stop position to a position adjacent the capstan when the plate is in its record position, bias means for urging the pressure roller to an active position wherein the roller is located with respect to the capstan for pressing tape against the capstan to effect feeding of the tape past the capstan when the plate is in its record position, and first means for moving the plate from its stop position to its record position, the improvement comprising:

an electrical connector on the recorder adapted for coupling with the electrical connector of the photographic apparatus for transmitting control signals between the photographic apparatus and the recorder;

second means for moving the plate from its stop position to its record position, said second moving means being responsive to coupling of said two electrical connectors;

means for disabling the bias means when the plate is moved to its record position by said second moving means; and electromechanical transducer means for selectively moving the pressure roller to its active position in response to said control signals when the bias means is so disabled.

5. The improvement as defined in claim 4 further comprising:

a manually movable control member for selectively positioning the plate in its record and stop positions;

lock means engageable by said control member for retaining said plate in its record position; and means for disengaging said lock means in response to coupling of said two electrical connectors.

6. In a tape recorder including a supply reel, a takeup reel, a transducing station, drive means engageable with a tape for advancing the tape from the supply reel past the transducing station to the takeup reel, and movable transducer means engageable with the tape at the transducer station for recording signals on the tape, the combination comprising:

a plate movable between a record position and a stop position;

first control means for moving said plate between its record position and its stop position;

means interconnecting said plate with the transducer means and with the tape drive means for moving the transducer means and the tape drive means into engagement with the tape to thereby advance the tape when said plate is moved to its record position and for moving the transducer means and the tape drive means out of engagement with the tape when said plate is moved to its stop position;

a ratchet connected with the supply reel for rotation therewith;

a pawl cooperatively engageable with the ratchet to prevent rotation of the supply reel;

second control means for moving said plate to its record position and for maintaining said pawl out of engagement with said ratchet except when said plate has been moved to its record position by said second control means;

means for generating electrical signals; and electromechanical transducer means mechanically connected with said pawl and electrically connected with said generating means for selectively engaging said pawl with said ratchet to selectively disable the tape drive means in response to electrical signals from said generating means when said plate has been moved to its record position by said second control means.

* * * * *